(12) United States Patent
Cheng et al.

(10) Patent No.: US 11,694,473 B2
(45) Date of Patent: Jul. 4, 2023

(54) ELECTRONIC CIRCUIT HAVING DISPLAY DRIVING FUNCTION, TOUCH SENSING FUNCTION AND FINGERPRINT SENSING FUNCTION

(71) Applicant: Novatek Microelectronics Corp., Hsinchu (TW)

(72) Inventors: Huan-Teng Cheng, Hsinchu (TW); Yuan Heng Lu, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/149,676

(22) Filed: Jan. 14, 2021

(65) Prior Publication Data

US 2021/0349598 A1 Nov. 11, 2021

Related U.S. Application Data

(60) Provisional application No. 63/021,662, filed on May 7, 2020.

(51) Int. Cl.
*G06F 3/041* (2006.01)
*G06V 40/12* (2022.01)

(52) U.S. Cl.
CPC ........ *G06V 40/1335* (2022.01); *G06F 3/0412* (2013.01); *G06F 3/04164* (2019.05)

(58) Field of Classification Search
None
See application file for complete search history.

(56) References Cited

U.S. PATENT DOCUMENTS

2020/0320269 A1* 10/2020 Kim .................. G06K 9/00087
2020/0356743 A1* 11/2020 Li ..................... G06K 9/00013
2022/0004065 A1   1/2022 Tang et al.

FOREIGN PATENT DOCUMENTS

CN      109683386      4/2019
TW      201704964      2/2017

OTHER PUBLICATIONS

"Office Action of Taiwan Counterpart Application", dated May 30, 2022, p. 1-p. 4.

* cited by examiner

*Primary Examiner* — Brian M Butcher
(74) *Attorney, Agent, or Firm* — JCIPRNET

(57) ABSTRACT

An electronic circuit adapted to drive a display panel including touch sensors and fingerprint sensors is provided. The electronic circuit includes a switch circuit and a control circuit. The switch circuit includes a plurality of first switch elements and a plurality of second switch elements. The control circuit is configured to generate control signals for controlling the switch circuit, so as to control the electronic circuit to transmit the display driving signals from the first circuit to the data lines through a first part of the first switch elements in a first time interval, and control the electronic circuit to receive the fingerprint sensing signals from the fingerprint sensors of the display panel through the second switch elements in a second time interval.

43 Claims, 12 Drawing Sheets

ELECTRONIC CIRCUIT HAVING DISPLAY DRIVING FUNCTION, TOUCH SENSING FUNCTION AND FINGERPRINT SENSING FUNCTION

CROSS-REFERENCE TO RELATED APPLICATION

This application claims the priority benefit of U.S. Provisional application Ser. No. 63/021,662, filed on May 7, 2020. The entirety of the above-mentioned patent applications is hereby incorporated by reference herein and made a part of this specification.

BACKGROUND

Technical Field

The invention relates to an electronic circuit, an electronic device and a display panel, more specifically, to an electronic circuit adapted to drive a display panel including touch sensors and fingerprint sensors, and to an electronic device including the electronic circuit and the display panel.

Description of Related Art

In recent years, demands for fingerprint sensing have been gradually increased. In order to reduce a volume of an electronic device, a fingerprint sensing region may overlap with a display region of the electronic device. For example, an under-display fingerprint identification technique is to embed fingerprint sensors to a display panel, and the fingerprint sensor may sense or capture a fingerprint image through the display panel. When a touch event such as fingerprint identification happens, a touch sensing circuit may report it to an application processor of the electronic device via a specified interface. Next, the application processor further controls a display driving circuit to drive the display panel to display image for fingerprint sensing. On the other hand, the application processor further controls a fingerprint sensing circuit to perform the fingerprint sensing operation. The fingerprint sensing circuit transmits sensing information to the application processor for fingerprint identification after the fingerprint sensing operation, and then the application processor completes the fingerprint identification according to the sensing information.

However, for an electronic circuit capable of driving a display panel to perform a display operation, a touch sensing operation and a fingerprint sensing operation, a plurality of I/O nodes and complex routing may be required between the electronic circuit and the display panel for signal transmission. The plurality of I/O nodes and complex routing would increase the width of the fan-out area corresponding to the electronic circuit and the frame border size of the display panel near the electronic circuit.

On the other hand, the display panel may be equipped with a plurality of multiplexers to receive display data from the electronic circuit. For example, if the display panel includes red, green and blue pixels, the multiplexers are designed as 1:3 multiplexers for receiving red, green and blue display data from the electronic circuit. However, for some applications, the display panel may include red, green, blue and white pixels, and thus the multiplexers are designed as 1:4 multiplexers for receiving red, green, blue and white display data from the electronic circuit. In this case, the resolution of the fingerprint image may be decreased.

SUMMARY

The invention is directed to an electronic circuit, an electronic device and a display panel, where the width of the fan-out area corresponding to the electronic circuit and the frame border size of the display panel near the electronic circuit are small. In addition, the resolution of the fingerprint image can be maintained.

An embodiment of the invention provides an electronic circuit adapted to drive a display panel including touch sensors and fingerprint sensors. The electronic circuit includes a first circuit, a second circuit, a first switch circuit and a control circuit. The first circuit is configured to generate display driving signals for driving data lines of the display panel. The second circuit is configured to receive fingerprint sensing signals corresponding to a fingerprint image from the fingerprint sensors. The first switch circuit includes a plurality of first switch elements and a plurality of second switch elements. The first switch elements are coupled to the first circuit, and the second switch elements are coupled to the second circuit. The control circuit is configured to generate control signals for controlling the first switch circuit, so as to control the electronic circuit to transmit the display driving signals from the first circuit to the data lines through a first part of the first switch elements in a first time interval, and control the electronic circuit to receive the fingerprint sensing signals from the fingerprint sensors of the display panel through the second switch elements in a second time interval.

An embodiment of the invention provides a display panel including a plurality of pixels and touch sensors, a plurality of data lines, a plurality of fingerprint sensors, a plurality of fingerprint sensing lines, and a switch circuit. The data lines are coupled to the pixels and configured to receive display driving signals. The fingerprint sensors are configured to sense a fingerprint image and generate fingerprint sensing signals corresponding to the fingerprint image. The fingerprint sensing lines are coupled to the fingerprint sensors and configured to transmit the fingerprint sensing signals. The switch circuit includes a plurality of first switch units and a plurality of second switch units. The first switch units are coupled to the data lines and a first part of the fingerprint sensing lines, and the second switch units are coupled to a second part of the fingerprint sensing lines. The first switch units are switched to receive the display driving signals from an electronic circuit in a first time interval, and the first switch units and the second switch units are switched to transmit the fingerprint sensing signals to the electronic circuit in a second time interval.

An embodiment of the invention provides an electronic device including a display panel and an electronic circuit. The display panel includes touch sensors and fingerprint sensors. The electronic circuit is configurable to be coupled to the display panel and adapted to drive the display panel with display driving signals and receive fingerprint sensing signals corresponding to a fingerprint image from the fingerprint sensors. The electronic circuit includes a first switch circuit. The first switch circuit includes a plurality of first switch elements and a plurality of second switch elements. The electronic circuit generates control signals for controlling the first switch circuit, so as to transmit the display driving signals to the display panel through a first part of the first switch elements in a first time interval, and receive the fingerprint sensing signals from the fingerprint sensors through the second switch elements in a second time interval.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments can be suitably combined. The term "coupling/coupled" or "connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." The term "signal" can refer to a current, a voltage, a charge, a temperature, data, electromagnetic wave or any one or multiple signals. In addition, the term "and/or" can refer to "at least one of". For example, "a first signal and/or a second signal" should be interpreted as "at least one of the first signal and the second signal".

Figure 1:
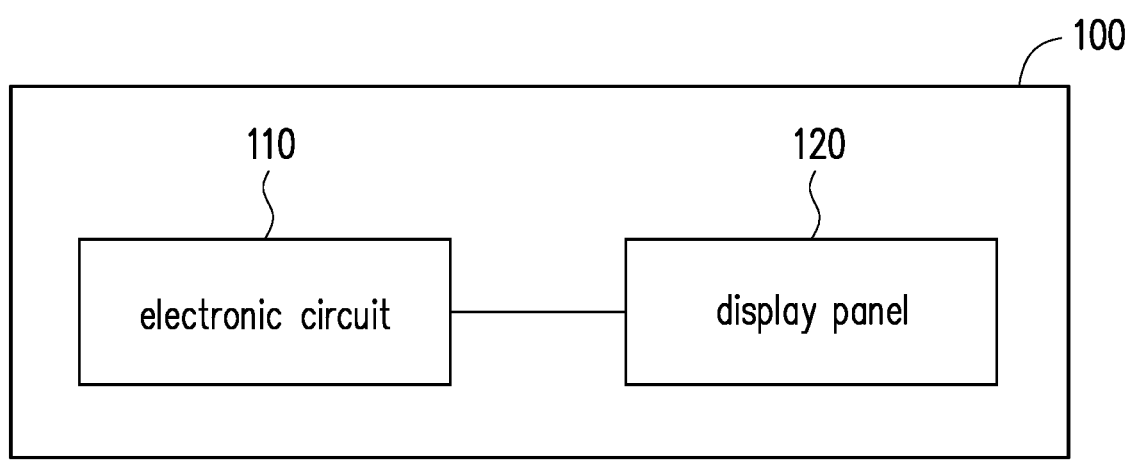
FIG. 1 is a schematic block diagram illustrating an electronic device according to an embodiment of the invention.

FIG. 1 is a schematic block diagram illustrating an electronic device according to an embodiment of the invention. Referring to FIG. 1, the electronic device 100 of the present embodiment includes an electronic circuit 110 and a display panel 120. The display panel 120 includes touch sensors and fingerprint sensors. The electronic circuit 110 is configurable to be coupled to the display panel 120. The electronic circuit 110 is adapted to drive the display panel 120.

In the present embodiment, the electronic device 100 may be an electronic device having a display function, a touch sensing function and a fingerprint sensing function. In an embodiment, the electronic device 100 may be, but not limited to, a smartphone, a non-smart phone, a wearable electronic device, a tablet computer, a personal digital assistant, a notebook and other portable electronic devices that can operate independently and have the display function, the touch sensing function and the fingerprint sensing function. In an embodiment, the electronic device 100 may be, but not limited to, a portable or un-portable electronic device in a vehicle intelligent system. In an embodiment, the electronic device 100 may be, but not limited to, intelligent home appliances such as, a television, a computer, a refrigerator, a washing machine, a telephone, an induction cooker, a table lamp and so on.

Figure 2:
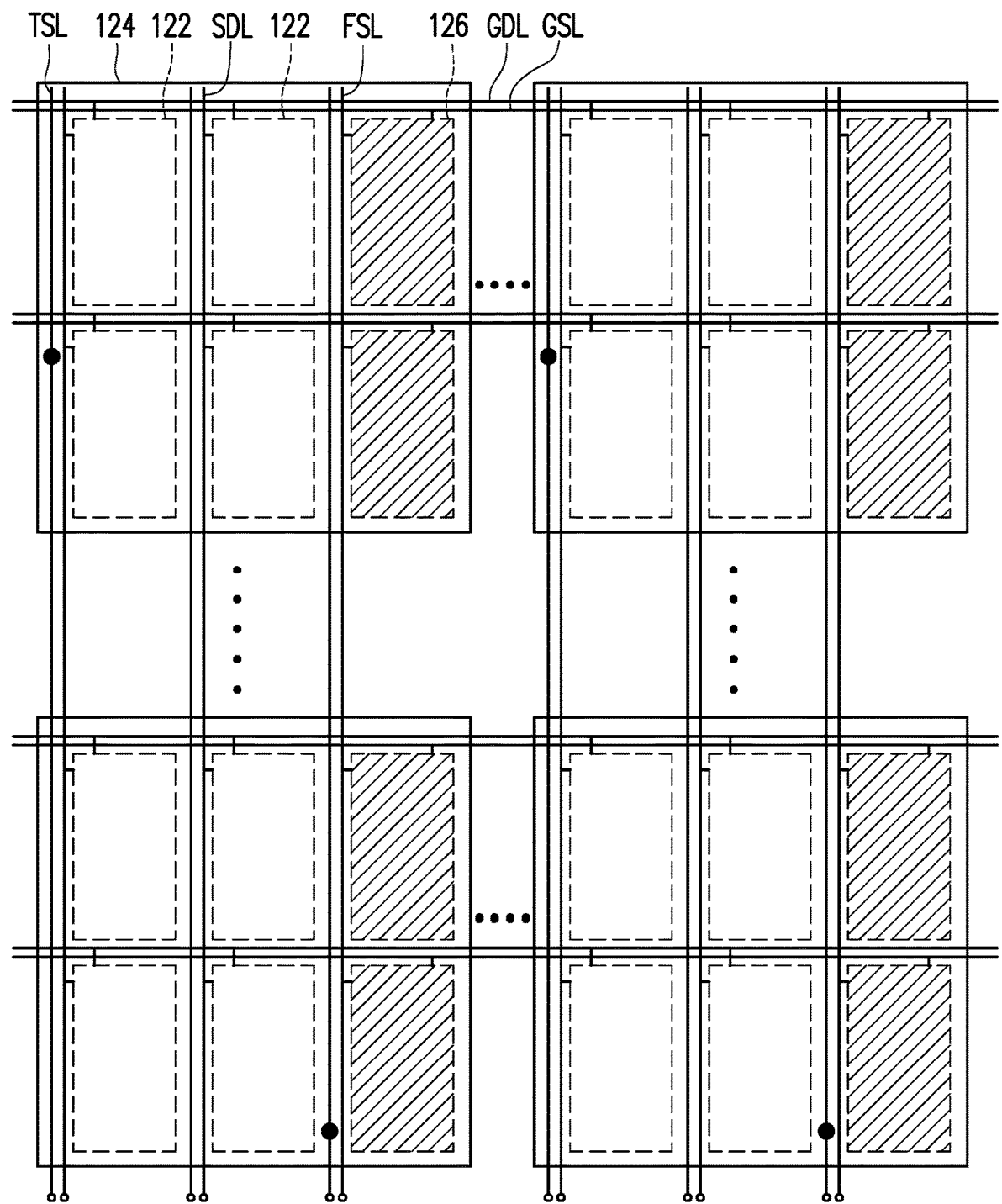
FIG. 2 is a schematic diagram illustrating the display panel depicted in FIG. 1.

FIG. 2 is a schematic diagram illustrating the display panel depicted in FIG. 1. Referring to FIG. 2, the display panel 120 of the present embodiment includes a plurality of display pixels 122, a plurality of touch sensors 124 and a plurality of fingerprint sensors 126. The electronic circuit 110 drives and controls the display panel 120 to perform a display operation, a touch sensing operation and a fingerprint sensing operation. To be specific, the electronic circuit 110 drives and controls the display pixels 122 to display images via display scan lines GDL and display data lines SDL. The electronic circuit 110 also drives and controls the touch sensors 124 to sense a touch event of the display panel 120 via touch scan lines and touch sensing lines TSL. In an embodiment, the touch sensors 124 may be touch sensing electrodes in a touch sensing phase, and the touch sensors 124 may be common electrodes in a display phase. In the present embodiment, in-cell touch sensors are depicted in FIG. 2 as an example. For the in-cell touch sensors, the display panel 120 inherently has no touch scan lines. For other type touch sensors, the display panel 120 may have touch scan lines for transmitting touch driving signals. In the embodiment of FIG. 2, the touch sensing lines TSL are also configured to transmit touch driving signals from the electronic circuit 110. The electronic circuit 110 also drives and controls the fingerprint sensors 126 to sense a fingerprint image on the display panel 120 via fingerprint scan lines GSL and fingerprint sensing lines FSL.

In an embodiment, the display panel 120 may be an in-cell fingerprint, touch and display panel that the fingerprint sensors and the touch sensors are embedded, but the invention is not limited thereto. In an embodiment, the electronic circuit 110 may drive and control the electronic device 100 to perform an in-display fingerprint identification operation, i.e. fingerprint recognition operation. In an embodiment, the fingerprint sensors 126 may be optical fingerprint sensors.

Figure 3:
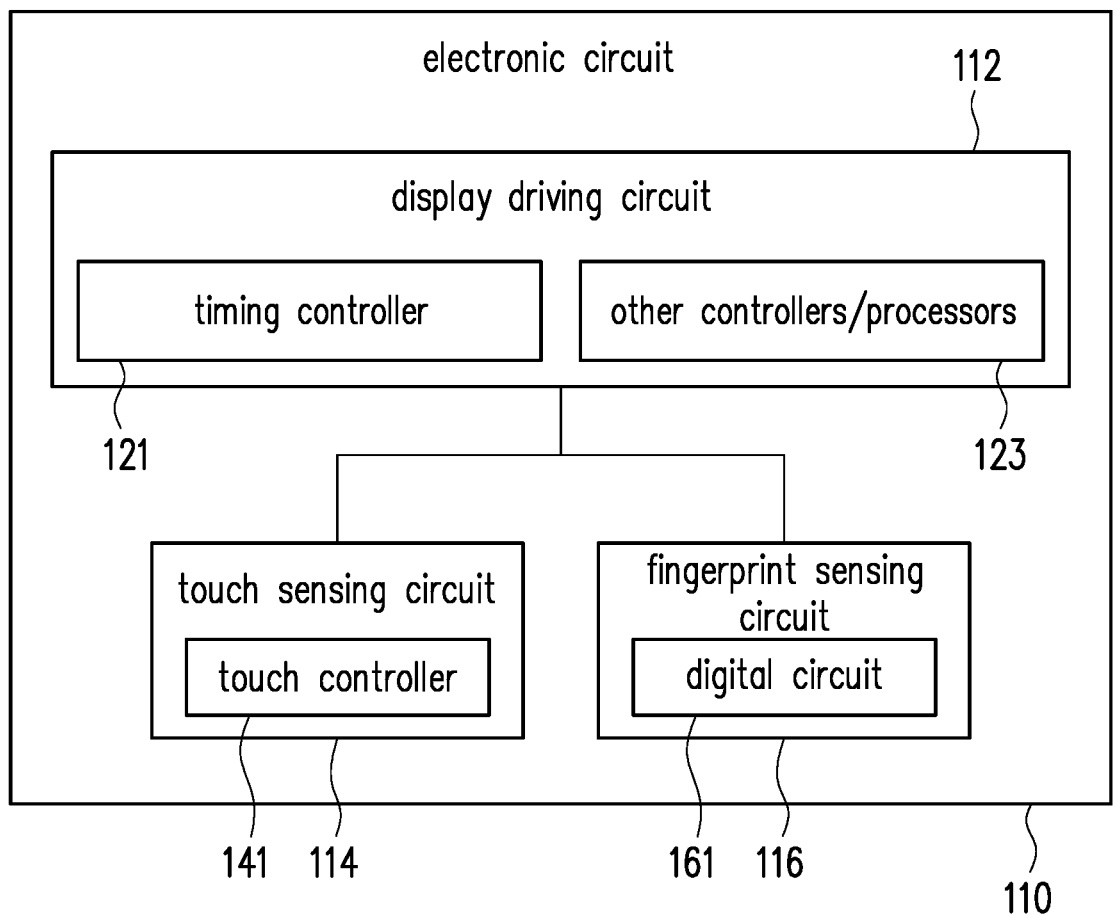
FIG. 3 is a schematic block diagram illustrating the electronic circuit depicted in FIG. 1.

FIG. 3 is a schematic block diagram illustrating the electronic circuit depicted in FIG. 1. Referring to FIG. 3, the electronic circuit 110 may include a display driving circuit 112 (a first circuit), a fingerprint sensing circuit 116 (a second circuit) and a touch sensing circuit 114 (a third circuit). The display driving circuit 112 is configured to drive and control the display pixels 122 to display images via the display scan lines GDL and the display data lines SDL. The display driving circuit 112 generates display driving signals for driving the display data lines SDL of the display panel 120. The display driving circuit 112 may include a timing controller 121, a display driver and other functional circuits for the display operation. The display driving circuit 112 may also include other controllers or processors 123 for other control activities of the display operation. The touch sensing circuit 114 is configured to drive and control the touch sensors 124 to sense the touch event of the display panel 120 via the touch sensing lines TSL. The touch sensing circuit 114 may include a touch controller 141, an analog front end (AFE) circuit, an analog-to-digital converter (ADC) circuit and other functional circuits for the touch sensing operation. The fingerprint sensing circuit 116 is configured to drive and control the fingerprint sensors 126 to sense the fingerprint on the display panel 120 via the fingerprint scan lines GSL and the fingerprint sensing lines FSL. The fingerprint sensing circuit 116 receives fingerprint sensing signals corresponding to a fingerprint image from the fingerprint sensors 126 and may also process the fingerprint sensing signals to obtain the fingerprint image. The fingerprint sensing circuit 116 may include a digital circuit 161, an AFE circuit, an ADC circuit and other functional circuits for the fingerprint sensing operation.

In an embodiment, the electronic circuit 110 is implemented as a single semiconductor chip. When the electronic circuit 110 is implemented as a single-chip integrated circuit that can drive and control the display panel 120 to perform the display operation, the touch sensing operation and the fingerprint sensing operation, the electronic circuit 110 may include a control circuit 130, and the control circuit 130 may be a micro-controller based core to perform all of control activities of the display operation, the touch sensing operation and the fingerprint sensing operation. The control circuit 130 may include at least one of the timing controller 121, the touch controller 141, the digital circuit 161, and the other controllers or processors 123 of the display driving circuit 112.

The display driving circuit 112, the touch sensing circuit 114 and the fingerprint sensing circuit 116 communicate with one another via signal transmission interfaces, such as Mobile Industry Processor Interface (MIPI), Inter-Integrated Circuit (I2C) Interface, Serial Peripheral Interface (SPI) and/or other similar or suitable interfaces.

Regarding hardware structures of the components in the embodiment of FIG. 3, the timing controller 121, the touch controller 141 and the digital circuit 161 may be a processor having computational capability. Alternatively, the timing controller 121, the touch controller 141 and the digital circuit 161 may be designed through hardware description languages (HDL) or any other design methods for digital circuits familiar to people skilled in the art and may be hardware circuits implemented through a field programmable gate array (FPGA), a complex programmable logic device (CPLD), or an application-specific integrated circuit (ASIC). In addition, enough teaching, suggestion, and implementation illustration for hardware structures of the display driving circuit 112, the touch sensing circuit 114 and the fingerprint sensing circuit 116 can be obtained with reference to common knowledge in the related art, which is not repeated hereinafter.

Figure 4:
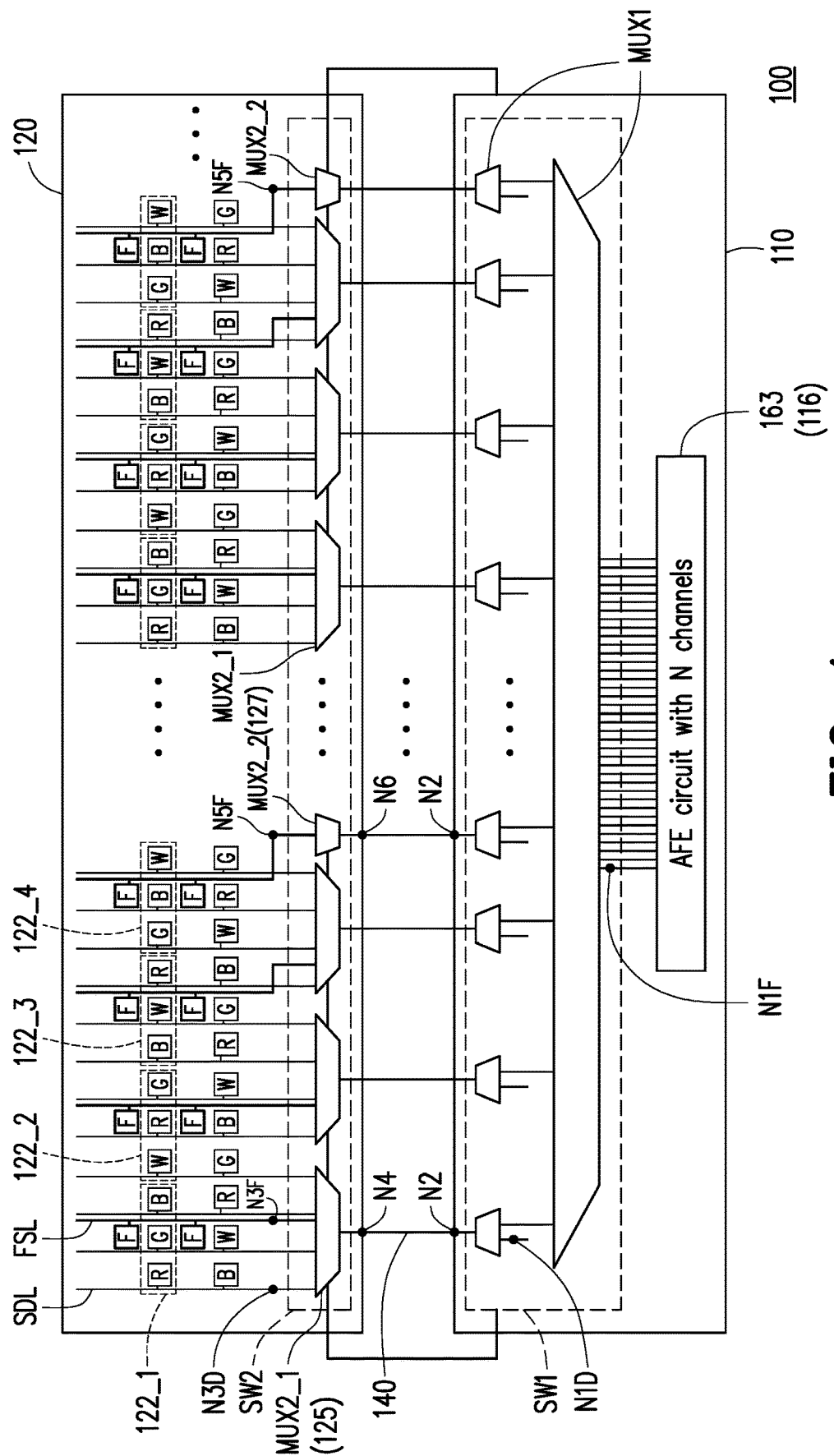
FIG. 4, FIG. 5A and FIG. 5B are schematic diagrams illustrating a routing structure between the electronic circuit and the display panel according to an embodiment of the invention.
Figure 5A:
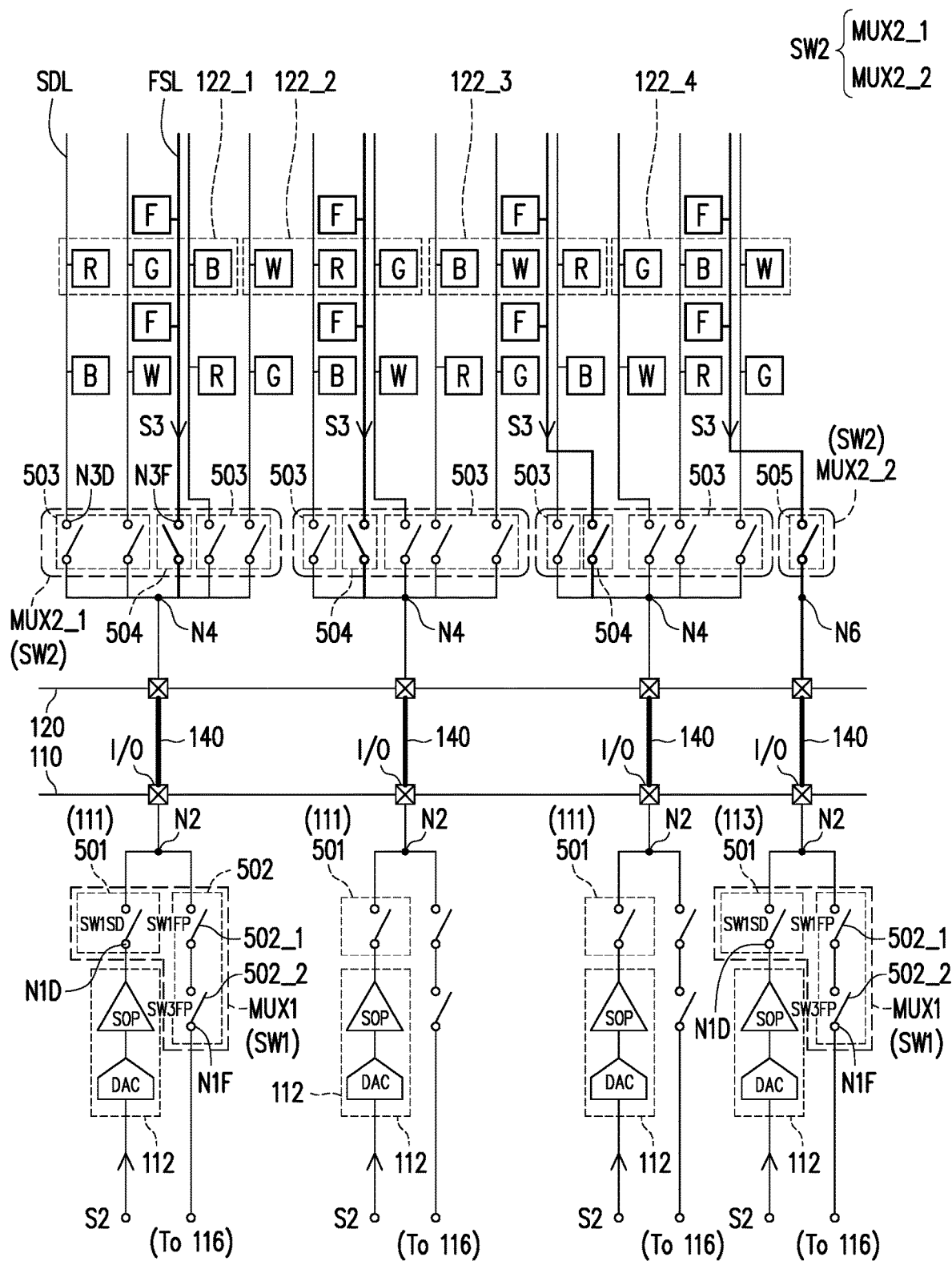
Figure 5B:
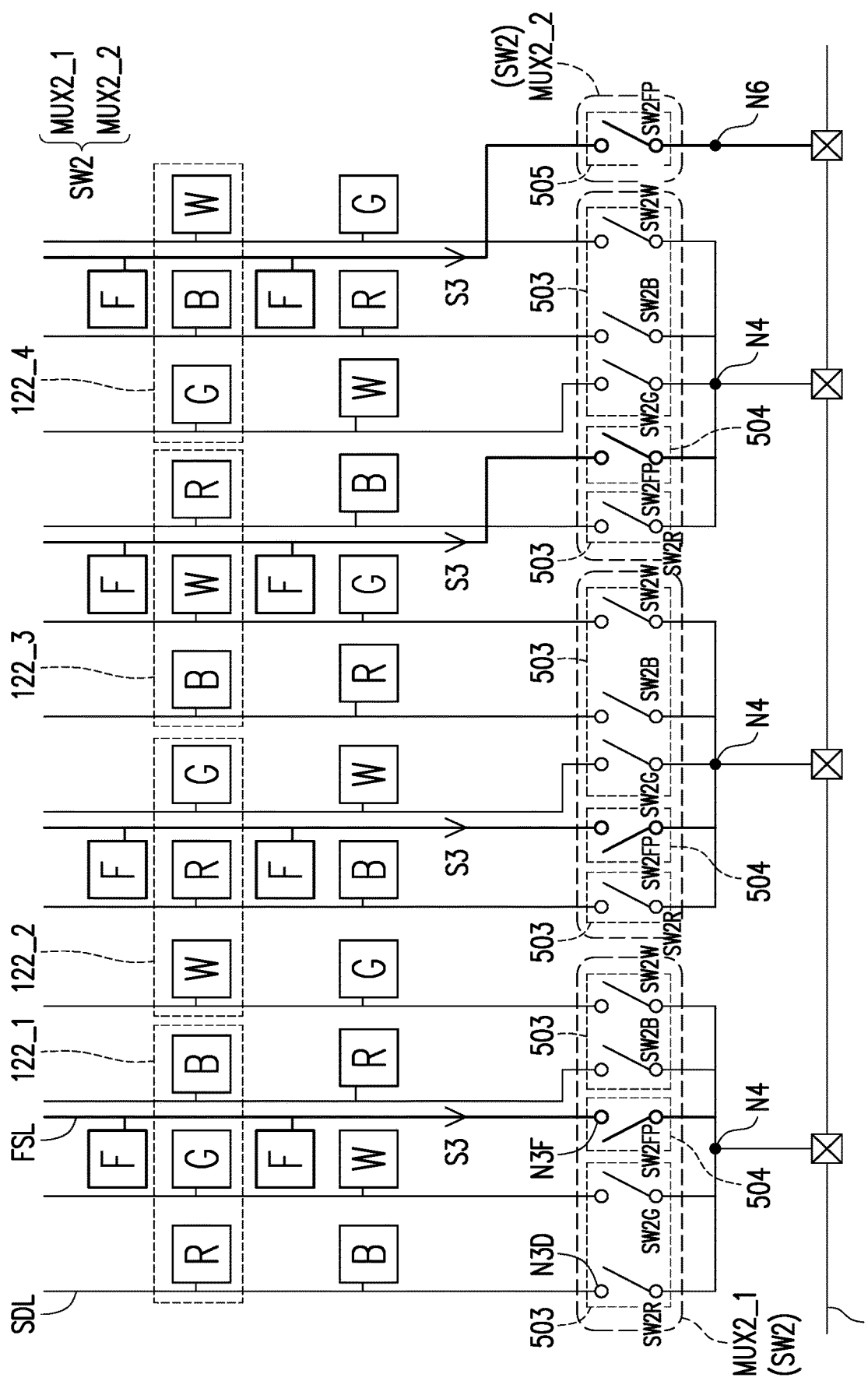

FIG. 4, FIG. 5A and FIG. 5B are schematic diagrams illustrating a routing structure between the electronic circuit and the display panel according to an embodiment of the invention. Referring to FIG. 3 to FIG. 5B, the electronic circuit 110 includes a switch circuit SW1 (a first switch circuit). The display panel 120 includes a switch circuit SW2 (a second switch circuit). The switch circuit SW1 is configurable to be coupled to the switch circuit SW2 via transmission lines 140. In the present embodiment, the switch circuit SW1 is disposed in the electronic circuit 110, and the display panel 120 does not include the switch circuit SW1. Therefore, the frame border size of the display panel 120 near the electronic circuit 110 is reduced.

The switch circuit SW1 includes a plurality of first terminals N1D and N1F and a plurality of second terminals N2. The number of the first terminals N1D and N1F is larger than the number of the second terminals N2. The first terminals N1D are coupled to the display driving circuit 112. In the present embodiment, the display driving circuit 112 includes an output buffer SOP and a signal converter DAC and outputs display driving signals S2 for driving the display panel 120. The first terminals N1F are coupled to an AFE circuit 163 of the fingerprint sensing circuit 116. The second terminals N2 is configurable to be coupled to the switch circuit SW2 of the display panel 120 via the transmission lines 140.

In the present embodiment, the switch circuit SW1 includes a plurality of switch units MUX1. Each of the switch units MUX1 includes a first switch element 501 and a second switch element 502. The first switch element 501 is coupled between the first circuit 112 and a corresponding one of the second terminals N2. The second switch element 502 is coupled between the second circuit 116 and a corresponding one of the second terminals N2.

The second switch element 502 may include a first switch device 502_1 and a second switch device 502_2. The first switch device 502_1 is coupled to the corresponding one of the second terminals N2 and the second circuit 116. The first switch device 502_1 is controlled to transmit the fingerprint sensing signals S3 to the second circuit 116 in the fingerprint sensing phase. The second switch device 502_2 is coupled between the first switch device 502_1 and the second circuit 116. The second switch device 502_2 is controlled to transmit the fingerprint sensing signals S3 to the second circuit 116 in response to a determination of a touch information in the fingerprint sensing phase. The first switch device 502_1 and the second switch device 502_2 are controlled by different control signals SW1FP and SW3FP, respectively. That is to say, the control signal SW1FP is asserted in the fingerprint sensing phase and the control signal SW3FP is asserted according to the touch information in the fingerprint sensing phase.

The switch circuit SW2 includes a plurality of third terminals N3D and N3F and a plurality of fourth terminals N4. The number of the third terminals N3D and N3F is larger than the number of the fourth terminals N4. The third terminals N3D are coupled to the display data lines SDL. The third terminals N3F are coupled to the fingerprint sensing lines FSL. The fourth terminals N4 are configurable to be coupled to the switch circuit SW1 of the electronic circuit 110 via the transmission lines 140. In addition, the switch circuit SW2 further includes a plurality of fifth terminals NSF and a plurality of sixth terminals N6. The number of the fifth terminals NSF is equal to the number of the sixth terminals N6. The fifth terminals NSF are coupled to the fingerprint sensing lines FSL. The sixth terminals N6 are configurable to be coupled to the switch circuit SW1 of the electronic circuit 110 via the transmission lines 140.

To be specific, the second switch circuit SW2 includes a plurality of switch units MUX2_1 (first switch units) and MUX2_2 (second switch units). In the present embodiment, every three first switch units MUX2_1 are grouped into a unit set, and each unit set is equipped with one second switch unit MUX2_2. The second switch units MUX2_2 are not adjacent to each other. For example, the second switch unit 127 is located between two first switch units MUX2_1 and not adjacent to a next second switch unit, where the right first switch unit and the next second switch unit of the second switch unit 127 are not illustrated in FIG. 4.

Each of the switch units MUX2_1 includes a plurality of third switch elements 503 and one or more fourth switch elements 504. The third switch elements 503 are coupled between the third terminals N3D (respective first part of the third terminals) and the fourth terminals N4 (one of the fourth terminals). The fourth switch element 504 is coupled between the third terminals N3F (respective second part of the third terminals) and the fourth terminals N4 (the one of the fourth terminals). The first part N3D of the third terminals N3D and N3F is coupled to the data lines SDL of the display panel 120, and the second part N3F of the third terminals N3D and N3F is coupled to the fingerprint sensing lines FSL. In the present embodiment, the third switch elements 503 are switched to receive the display driving signals S2 from the electronic circuit 110 in the display driving phase. The fourth switch element 504 is switched to transmit the fingerprint sensing signals S3 to the electronic circuit 110 in the fingerprint sensing phase.

Each of the switch units MUX2_2 includes a fifth switch element 505. The fifth switch element 505 is coupled between the respective fifth terminal NSF and the respective sixth terminal N6. The fifth switch elements 505 are switched to transmit the fingerprint sensing signals S3 to the second switch elements 502 of the electronic circuit 110 in the second time interval.

In the present embodiment, the pixels 122_1, 122_2, 122_3 and 122_4 respectively include sub-pixels of different colors. For example, the pixel 122_1 includes a red sub-pixel R, a green sub-pixel G and a blue sub-pixel B, and the pixel 122_2 includes a white sub-pixel W, a red sub-pixel R and a green sub-pixel G. In addition, the data lines SDL coupled to the same first switch unit MUX2_1 are connected to sub-pixels of four different colors, and the sub-pixels of the four different colors arranged in a row. For example, the data lines SDL coupled to the same first switch unit 125 are connected to a red sub-pixel R, a green sub-pixel G, a blue sub-pixel B and a white sub-pixel W, and the red sub-pixel R, the green sub-pixel G, the blue sub-pixel B and the white sub-pixel W are arranged in the first pixel row. On the other hand, the data lines SDL coupled to the same first switch unit 125 are connected to a blue sub-pixel B, a white sub-pixel W, a red sub-pixel R and a green sub-pixel G, and the blue sub-pixel B, the white sub-pixel W, the red sub-pixel R and the green sub-pixel G are arranged in the second pixel row. The connection relationship of the data lines SDL and the sub-pixels are shown in FIG. 4, and therefore no further description is provided herein.

In the present embodiment, the control circuit 130 is configured to generate control signals for controlling the switch circuits SW1 and SW2. For example, the control circuit 130 generates the control signals SW1SD, SW1FP and SW3FP to control corresponding switch elements of the switch circuit SW1, and generates the control signals SW2R, SW2G, SW2B, SW2W and SW2FP to control corresponding switch elements of the switch circuit SW2.

In the display driving phase, the control signal SW1SD turns on a first part 111 of the switch elements 501 but turns off a second part 113 of the switch elements 501 of the switch circuit SW1. The control signals SW2R, SW2G, SW2B and SW2W also turn on the corresponding switch elements of the switch circuit SW2 in the display driving phase. The switch circuit SW2 is switched to receive the display driving signals S2 from the electronic circuit 110 in the display driving phase. To be specific, the third switch elements 503 are switched to receive the display driving signals S2 from the electronic circuit 110 in the display driving phase. On the other hand, the control signals SW1FP and SW3FP turn off all of the switch elements 502 of the switch circuit SW1, and the control signal SW2FP turns off the switch elements 504 and 505 of the switch circuit SW2 in the display driving phase.

Therefore, the display driving signals S2 are outputted from the electronic circuit 110 to the display panel 120 via the transmission lines 140 and the switch circuits SW1 and SW2. That is to say, the control circuit 130 generates the control signals SW1SD, SW2R, SW2G, SW2B and SW2W for controlling the switch circuits SW1 and SW2, so as to control the electronic circuit 110 to transmit the display driving signals S2 from the display driving circuit 112 to the data lines SDL through the switch circuit SW1, e.g. the first part 111 of the switch elements 501, and the switch circuit SW2 in the display driving phase. In the present embodiment, since the data lines SDL coupled to the same first switch unit MUX2_1 are connected to sub-pixels of four different colors which are arranged in a pixel row, the display driving signals S2 are multiplexed RGBW signals and delivered to respective data lines SDL on the display panel 120 through the switch circuits SW1 and SW2.

In the fingerprint sensing phase, the control signals SW1FP and SW3FP turn on the corresponding switch elements of the switch circuit SW1, and the control signal SW2FP turns on the corresponding switch elements of the switch circuit SW2. The switch circuit SW2 is switched to transmit the fingerprint sensing signals S3 from the display panel 120 to the electronic circuit 110 in the fingerprint sensing phase. To be specific, the fourth switch elements 504 and the fifth switch elements 505 are switched to transmit the fingerprint sensing signals S3 to the electronic circuit 110 in the fingerprint sensing phase.

On the other hand, the control signal SW1SD turns off the corresponding switch elements of the switch circuit SW1, and the control signals SW2R, SW2G, SW2B and SW2W turn off the corresponding switch elements of the switch circuit SW2. Therefore, the fingerprint sensing signals S3 are inputted from the display panel 120 to the electronic circuit 110 via the transmission lines 140 and the switch circuits SW1 and SW2. That is to say, the control circuit 130 generates the control signals SW1FP, SW3FP and SW2FP for controlling the switch circuits SW1 and SW2, so as to control the electronic circuit 110 to receive the fingerprint sensing signals S3 from the fingerprint sensors 126 to the AFE circuit 163 of the fingerprint sensing circuit 116 through the switch circuit SW1, e.g. the second switch elements 502, and the switch circuit SW2 in the fingerprint sensing phase. In the present embodiment, the transmission lines 140 are shared by the display driving signals S2 and the fingerprint sensing signals S3. The display driving signals S2 and the fingerprint sensing signals S3 are transmitted on the transmission lines 140 in different phases.

In the present embodiment, the switch unit MUX2_1 may be a 1:5 multiplexer in the present embodiment. In the display driving phase, the control signals SW2R, SW2G, SW2B and SW2W sequentially turn on the corresponding switch elements of the switch units MUX2_1. In the fingerprint sensing phase, the control signal SW2FP turns on the corresponding switch elements of the switch units MUX2_1 and MUX2_2.

Figure 6:
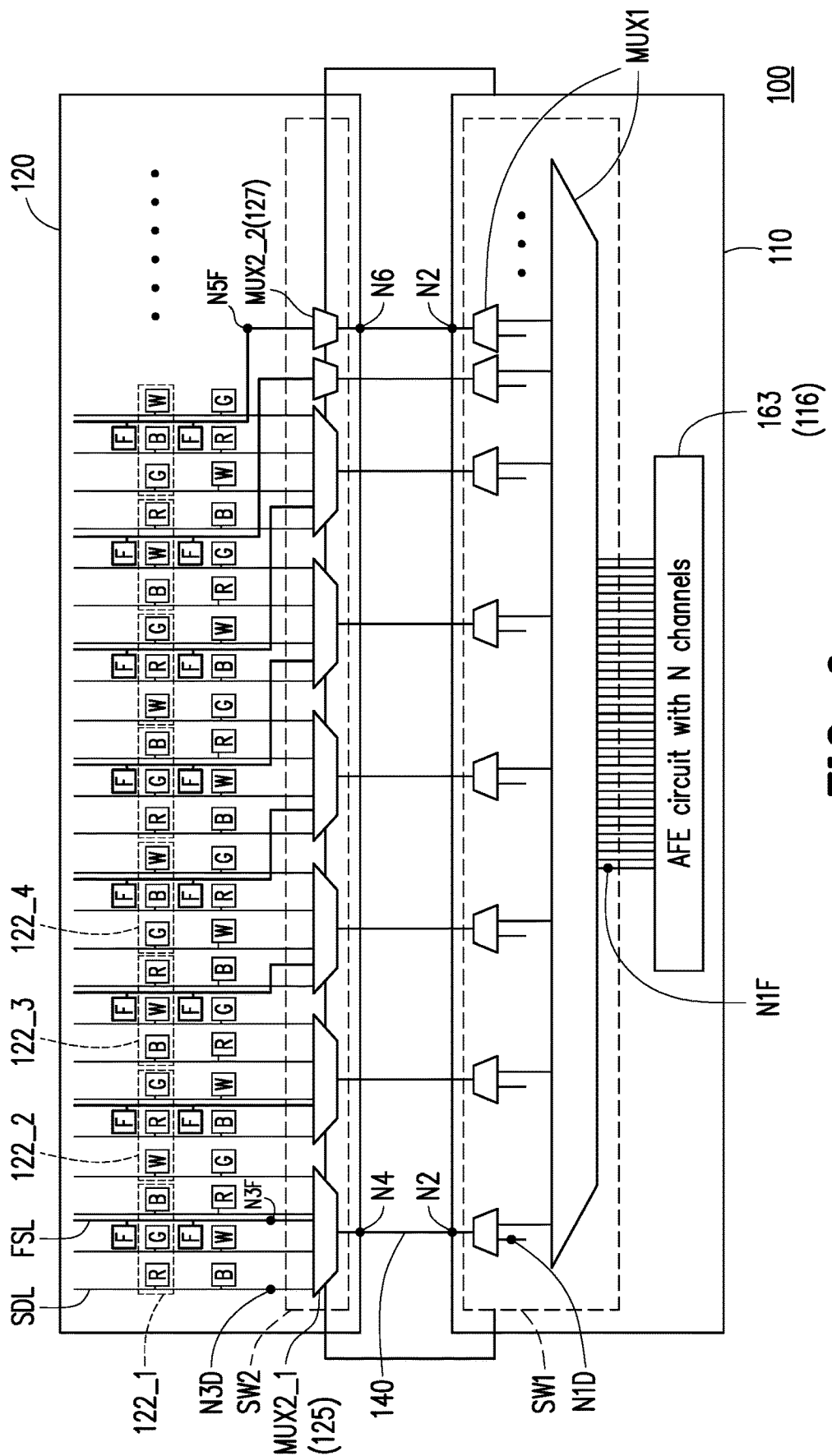
FIG. 6 is a schematic diagram illustrating a routing structure between the electronic circuit and the display panel according to another embodiment of the invention.

FIG. 6 is a schematic diagram illustrating a routing structure between the electronic circuit and the display panel according to an embodiment of the invention. Referring to FIG. 4 and FIG. 6, the electronic device 100 of the present embodiment is similar to that of the electronic device 100 depicted in FIG. 4, and the main difference therebetween, for example, lies in that at least two of the second switch units MUX2_2 are adjacent in the present embodiment. every six first switch units MUX2_1 are grouped into a unit set, and each unit set is equipped with two second switch units MUX2_2 as illustrated in FIG. 6. The second switch units MUX2_2 are adjacent.

In FIG. 4 and FIG. 6, the second switch units MUX2_2 are added to the second switch circuit for signal transmission. The second switch units MUX2_2 are configured to transmit the fingerprint sensing signal S3 from the fingerprint sensing lines FSL to the electronic circuit 110 via the transmission lines 140. Therefore, the resolution of the fingerprint image can be maintained under the condition that the transmission lines 140 are shared by the display driving signals S2 and the fingerprint sensing signals S3.

Figure 7:
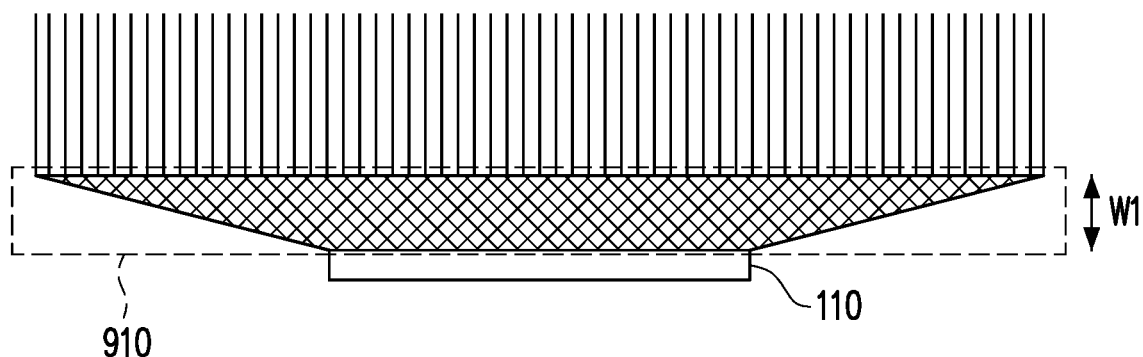
FIG. 7 is a schematic diagram illustrating a fan-out area corresponding to the electronic circuit according to an embodiment of the invention.
Figure 8:
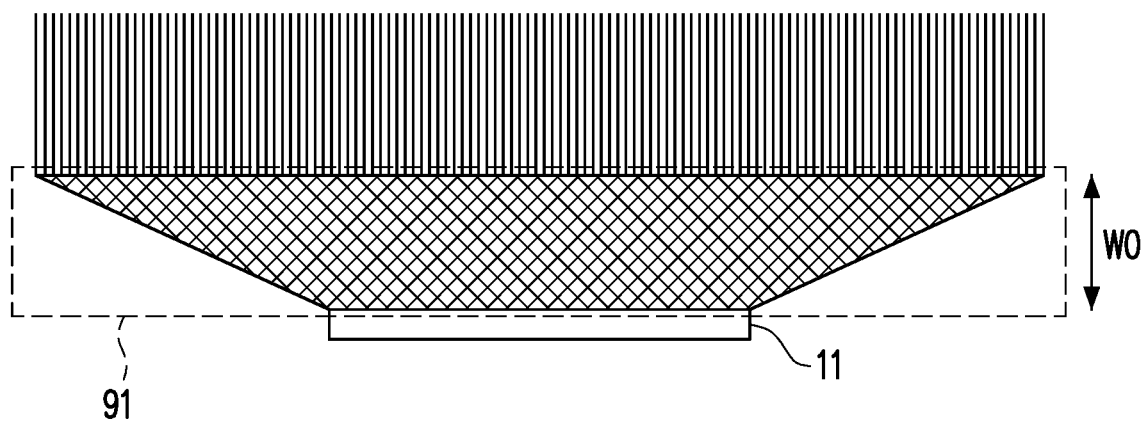
FIG. 8 is a schematic diagram illustrating a fan-out area corresponding to the electronic circuit in a related art.

FIG. 7 is a schematic diagram illustrating a fan-out area corresponding to the electronic circuit according to an embodiment of the invention. FIG. 8 is a schematic diagram illustrating a fan-out area corresponding to the electronic circuit in a related art. In the embodiment of FIG. 4 to FIG. 6, the electronic circuit 110 outputs the display driving signals S2 to the display panel 120 and receives the fingerprint sensing signals S3 from the display panel 120 via the same I/O node, e.g. I/O pin, as depicted in FIG. 5A and FIG. 5B. The display driving signals S2 and the fingerprint sensing signals S3 are transmitted on the transmission lines 140 in different phases, and the transmission lines 140 are shared by the display driving signals S2 and the fingerprint sensing signals S3. The number of the I/O nodes is less, and the routing is simple between the electronic circuit 110 and the display panel 120. Therefore, the width W1 of the fan-out area 910 corresponding to the electronic circuit 110 is smaller than the width W0 of the fan-out area 91 corresponding to the electronic circuit 11. The frame border size of the display panel 120 near the electronic circuit 110 is reduced. For example, the frame border size can be kept within a specified width, e.g. 2 millimeters, in the present embodiment even if the fingerprint sensing function is combined into the electronic device 100.

Figure 9:
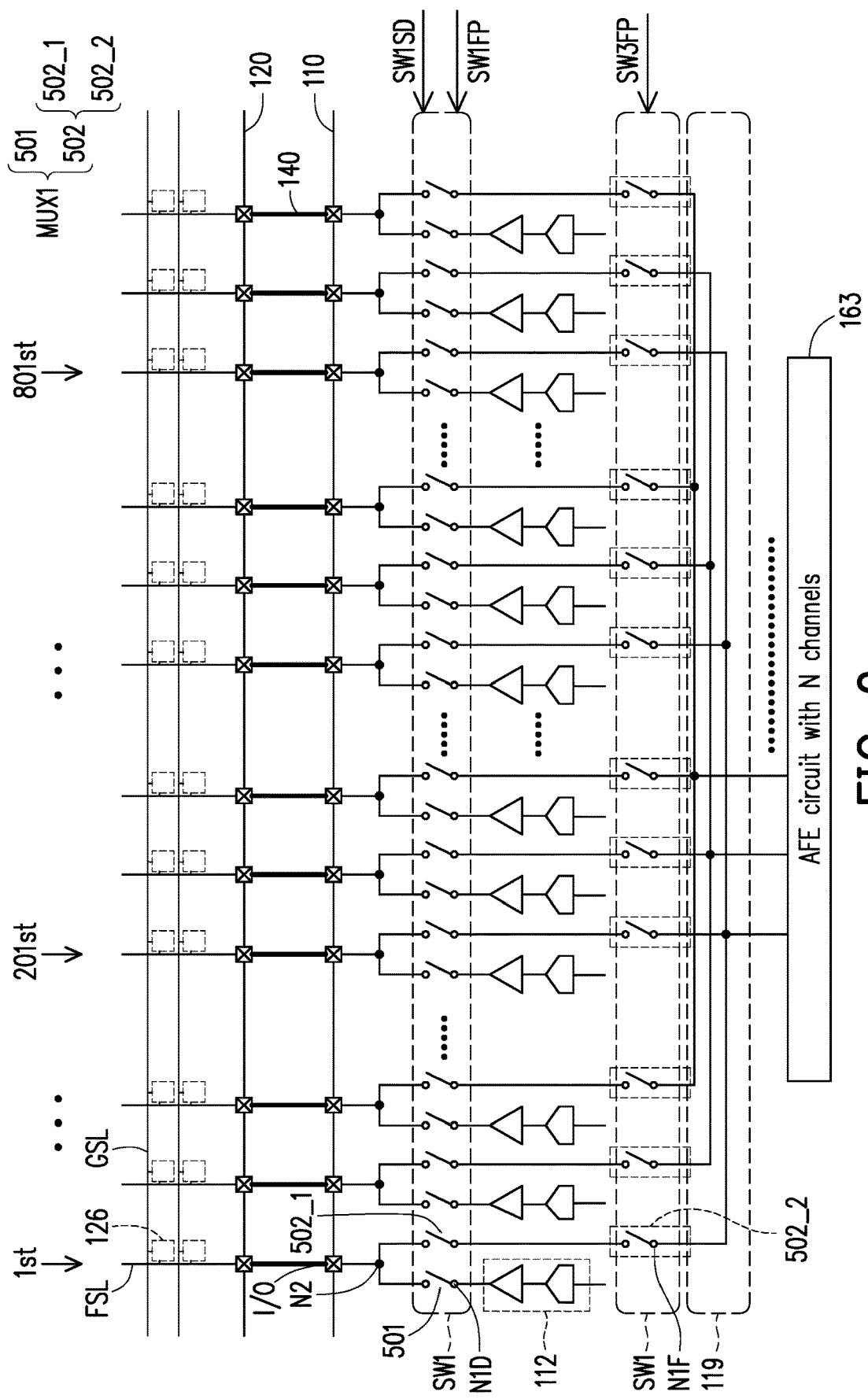
FIG. 9 is a schematic diagram illustrating a routing structure of the electronic circuit according to an embodiment of the invention.

FIG. 9 is a schematic diagram illustrating a routing structure of the electronic circuit according to an embodiment of the invention. Referring to FIG. 9, in the present embodiment, the switch circuit SW1 includes a plurality of the switch units MUX1, and each of the switch units MUX1 includes a first switch element 501 and a second switch element 502. The second switch element 502 includes a first switch device 502_1 and a second switch device 502_2. For clarity, only the fingerprint sensors 126, the fingerprint scan lines GSL and the fingerprint sensing lines FSL are illustrated in the display panel 120. The detail structure of the display panel 120 can refer to FIG. 4.

In the present embodiment, the electronic circuit 110 further includes a wire grouping circuit 119. The wire grouping circuit 119 is coupled between the switch circuit SW1 and the AFE circuit 163 of the fingerprint sensing circuit 116. The second switch elements 502 are grouped into a plurality of groups and connected to the AFE circuit 163 through the wire grouping circuit 119. The control circuit 130 generates control signals SW1FP and SW3FP for controlling the second switch elements 502. The second switch elements 502 can be independently controlled by the control circuit 130. The second switch element 502 includes the first switch device 502_1 and the second switch device 502_2. The control circuit 130 determines which second switch element 502 to be turned on or turned off according to a touch information (e.g. a touch area TSA to be depicted in FIG. 10). For example, the second switch devices 502_2 may be controlled to transmit the fingerprint sensing signals S3 to the fingerprint sensing circuit 116 in response to a determination of the touch information, e.g. the touch area TSA, in the fingerprint sensing phase, and the corresponding first switch devices 502_1 are conducted. The second switch elements 502 that are turned on establish the coupling between the fingerprint sensing lines FSL and the fingerprint sensing channels for the fingerprint sensing operation.

In the present embodiment, the wire grouping circuit 119 is coupled between the switch circuit SW1 and the AFE circuit 163 for wire-OR multiple fingerprint sensing lines FSL to each of the sensing channels in the AFE circuit 163. By grouping the second switch elements, the wire grouping circuit 119 groups the fingerprint sensing lines FSL into a plurality of groups, and the groups are correspondingly connected to the fingerprint sensing channels in the AFE circuit 163. Each group of the fingerprint sensing lines FSL corresponds to one fingerprint sensing channel. For example, the AFE circuit 163 may be designed to have 200 fingerprint sensing channels, and the number of the fingerprint sensing lines FSL is 1000. The 1000 fingerprint sensing lines are grouped into 200 groups each having five fingerprint sensing lines. The first fingerprint sensing line, the $201^{st}$ fingerprint sensing line, the $401^{st}$ fingerprint sensing line, the $601^{st}$ fingerprint sensing line and the $801^{st}$ fingerprint sensing line are connected with one another in the same group via the corresponding switch devices 502_1 and 502_2 and the wire grouping circuit 119 and coupled to the first fingerprint sensing channel. Similarly, the second fingerprint sensing line, the $202^{nd}$ fingerprint sensing line, the $402^{nd}$ fingerprint sensing line, the $602^{nd}$ fingerprint sensing line and the $802^{nd}$ fingerprint sensing line are connected with one another in the same group via the corresponding switch devices 502_1 and 502_2 and the wire grouping circuit 119 and coupled to the second fingerprint sensing channel. The connection relationship of the rest fingerprint sensing lines and the rest fingerprint sensing channels can be deduced by analogy. In the same group, the fingerprint sensing lines FSL are wire-OR and are not shorted at the same time.

The number of the fingerprint sensing lines FSL, the number of the fingerprint sensing channels and the connection relationship of the fingerprint sensing lines FSL and the fingerprint sensing channels are disclosed for example, and the invention is not limited thereto.

The control circuit 130 generates the control signals SW1FP, SW1SD and SW3FP for controlling the switch circuit SW1, so as to control the electronic circuit 110 to receive the fingerprint sensing signals S3 from the fingerprint sensors 126 to the AFE circuit 163 through the switch circuit SW1 in the fingerprint sensing phase. In the fingerprint sensing phase, the control signals SW1FP and SW3FP turn on the corresponding switch elements of the switch circuit SW1, and the control signal SW1SD turns off the corresponding switch elements of the switch circuit SW1. In the present embodiment, the first switch device 502_1 and the second switch device 502_2 are controlled by different control signals SW1FP and SW3FP, respectively. The control signal SW1FP is asserted in the fingerprint sensing phase, and the control signal SW3FP is asserted according to the touch information in the fingerprint sensing phase. That is to say, the transmission path between the first terminal N1F and the second terminal N2 is conducted according to the touch information in the switch circuit SW1. Thus, the electronic circuit 110 receives the fingerprint sensing signals S3 from the fingerprint sensors 126 through the switch circuit SW1.

Figure 10:
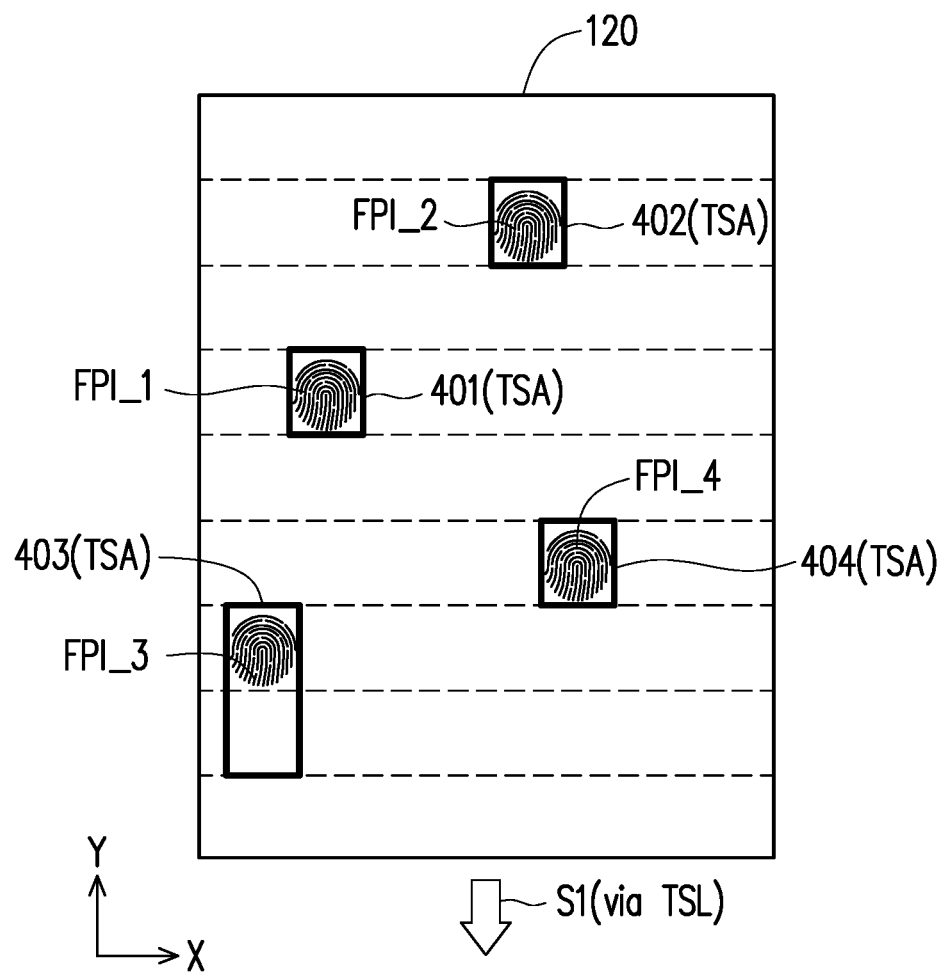
FIG. 10 is a schematic diagram illustrating a display panel operating for fingerprint sensing according to an embodiment of the invention.

FIG. 10 is a schematic diagram illustrating a display panel operating for fingerprint sensing according to an embodiment of the invention. Referring to FIG. 4, FIG. 5A, FIG. 5B, FIG. 9 and FIG. 10, the electronic circuit 110 may drive and control the display panel 120 to sense one or more fingerprint images FPI_1, FPI_2, FPI_3 and FPI_4 as detected and presented on the display panel 120. In the present embodiment, the fingerprint sensing lines FSL are extended in the direction Y, e.g. the vertical direction, and are arranged in parallel, side by side in the direction X, e.g. the horizontal direction, as shown in FIG. 2. The display panel 120 is not fixedly partitioned in advance into fingerprint sensing zones for fingerprint sensing in at least the direction X. That is to say, the display panel 120 has no predetermined fingerprint sensing zones for the fingerprint sensing lines FSL in the X direction. The size and shape of the fingerprint sensing zones are not determined in advance. Fingerprint sensing zones 401, 402, 403 and 404 can be flexibly formed for fingerprint sensing by selecting a part of the fingerprint sensing lines FSL among a plurality of the fingerprint sensing lines FSL arranged all over the display panel 120. Each of the fingerprint sensing lines FSL is selectable to be edges or boundaries of the fingerprint sensing zones 401, 402, 403 and 404. As there are no predetermined zones in the X-direction, there is no need to perform a cross over (with attendant delays) to process a different zone during a sensing process.

To be specific, the control circuit 130 determines one or more touch areas TSA corresponding to the fingerprint image FPI_1, FPI_2, FPI_3 and FPI_4 according to a touch sensing signal S1 that is outputted via the touch sensing lines TSL as depicted in FIG. 2. The control circuit 130 may determine an individual size range for each of the individual touch areas TSA. Alternatively, the control circuit 130 may simply determine coordinate information indicating a center or near center location of each of the touch areas TSA and assign each of the touch areas TSA a predetermined size. The size predetermined for each of the touch areas TSA may depend on design requirements, for example, a number of fingerprint sensing channels designed in the AFE circuit 163. The determined touch area TSA defines a fingerprint sensing zone for covering a fingerprint image. In the fingerprint sensing phase, the control signal SW1FP is asserted, and the control circuit 130 controls the first switch devices 502_1 to be conducted by using the asserted control signal SW1FP. On the other hand, the control signal SW3FP is asserted according to the touch information in the fingerprint sensing phase, and the control circuit 130 controls a part of the second switch devices 502_2 to be conducted by using the asserted control signal SW3FP. The part of the second switch devices 502_2 are conducted for selecting a part of the fingerprint sensing lines FSL for the fingerprint sensing operation according to the determined touch area TSA. The second switch devices 502_2 corresponding to the selected fingerprint sensing lines FSL are conducted. In FIG. 9, the second switch devices 502_2 corresponding to the selected fingerprint sensing lines FSL are turned on according to the asserted control signal SW3FP, and the second switch devices 502_2 corresponding to the unselected fingerprint sensing lines FSL are turned off according to the de-asserted control signal SW3FP. The fingerprint sensing signals S3 from the fingerprint sensors 126 are transmitted to the AFE circuit 163 via the selected fingerprint sensing lines FSL. That is to say, the touch sensing circuit 114 determines a touch information according to the touch sensing signals S1, and the second switch devices 502_2 are controlled to transmit the fingerprint sensing signals S3 to the fingerprint sensing circuit 116 in response to the determination of the touch information. The fingerprint sensing circuit 116 receives the fingerprint sensing signals S3 through fingerprint sensing lines FSL of the display panel 120 selected according to the touch information.

By controlling the conduction state of the second switch devices 502_2, a part of the fingerprint sensing lines FSL collocated with the touch area TSA on the display panel 120 is selected among a plurality of the fingerprint sensing lines FSL arranged all over the display panel 120. In the present embodiment, the selected part of fingerprint sensing lines FSL may flexibly form a single fingerprint sensing zone 401, 402, 403 or 404 having a size/range determined by the touch area TSA, such that only a single-scan is required for receiving of fingerprint sensing signals in fingerprint sensing channels in the horizontal direction (X direction) for the fingerprint image FPI_1, FPI_2, FPI_3 or FPI_4. It is thus to solve cross zone problem in receiving the fingerprint sensing signals of the fingerprint image FPI_1, FPI_2, FPI_3 or FPI_4 in the horizontal direction. The time for fingerprint sensing is thus reduced.

Figure 11:
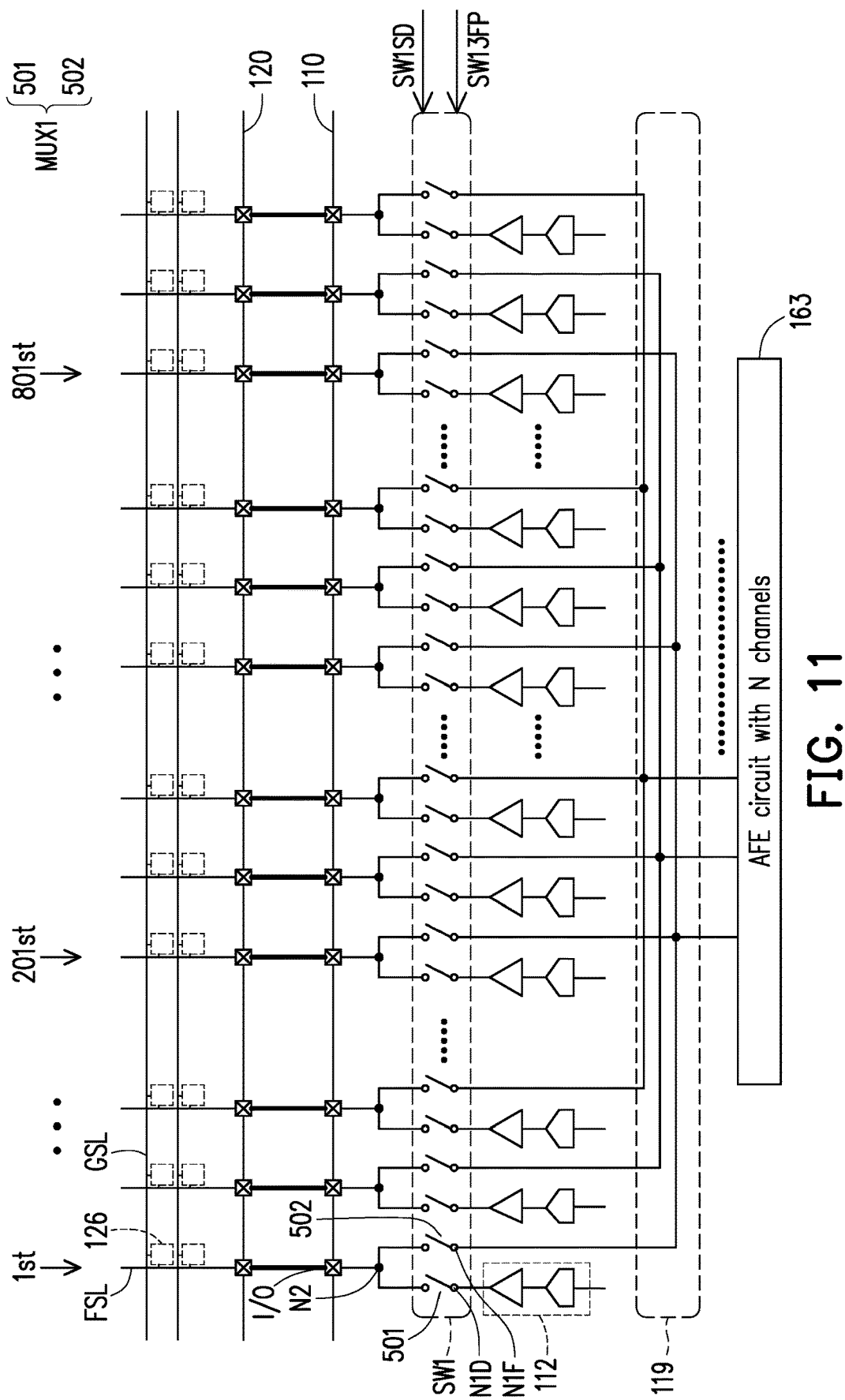
FIG. 11 is a schematic diagram illustrating a routing structure of the electronic circuit according to another embodiment of the invention.

FIG. 11 is a schematic diagram illustrating a routing structure of the electronic circuit according to another embodiment of the invention. Referring to FIG. 9 and FIG. 11, the electronic circuit 110 of the present embodiment is similar to that of the electronic circuit 110 depicted in FIG. 9, and the main difference therebetween, for example, lies in that the second switch elements 502 of the present embodiment are controlled by a control signal SW13FP. In the present embodiment, according to design requirement, the second switch devices 502_2 of FIG. 9 can be omitted in FIG. 11 or deemed as merged with the first switch devices 502_1 to form the second switch elements 502 depicted in FIG. 11.

To be specific, the control signal SW13FP is asserted according to the touch information in the fingerprint sensing phase. The control circuit 130 controls a part of the second switch elements 502 to be conducted by using the asserted control signal SW13FP. The part of the second switch elements 502 are conducted for selecting a part of the fingerprint sensing lines FSL for the fingerprint sensing operation according to the determined touch area TSA. The second switch elements 502 corresponding to the selected fingerprint sensing lines FSL are conducted. In FIG. 11, the second switch elements 502 corresponding to the selected fingerprint sensing lines FSL are turned on according to the asserted control signal SW13FP, and the second switch elements 502 corresponding to the unselected fingerprint sensing lines FSL are turned off according to the de-asserted control signal SW13FP.

The number of the fingerprint sensing lines FSL, the number of the fingerprint sensing channels and the connection relationship of the fingerprint sensing lines FSL and the fingerprint sensing channels are disclosed for example, and the invention is not limited thereto.

In addition, the operation of the electronic circuit 110 of the embodiment of the invention is sufficiently taught, suggested, and embodied in the embodiments illustrated in FIG. 9 and FIG. 10, and therefore no further description is provided herein.

Figure 12:
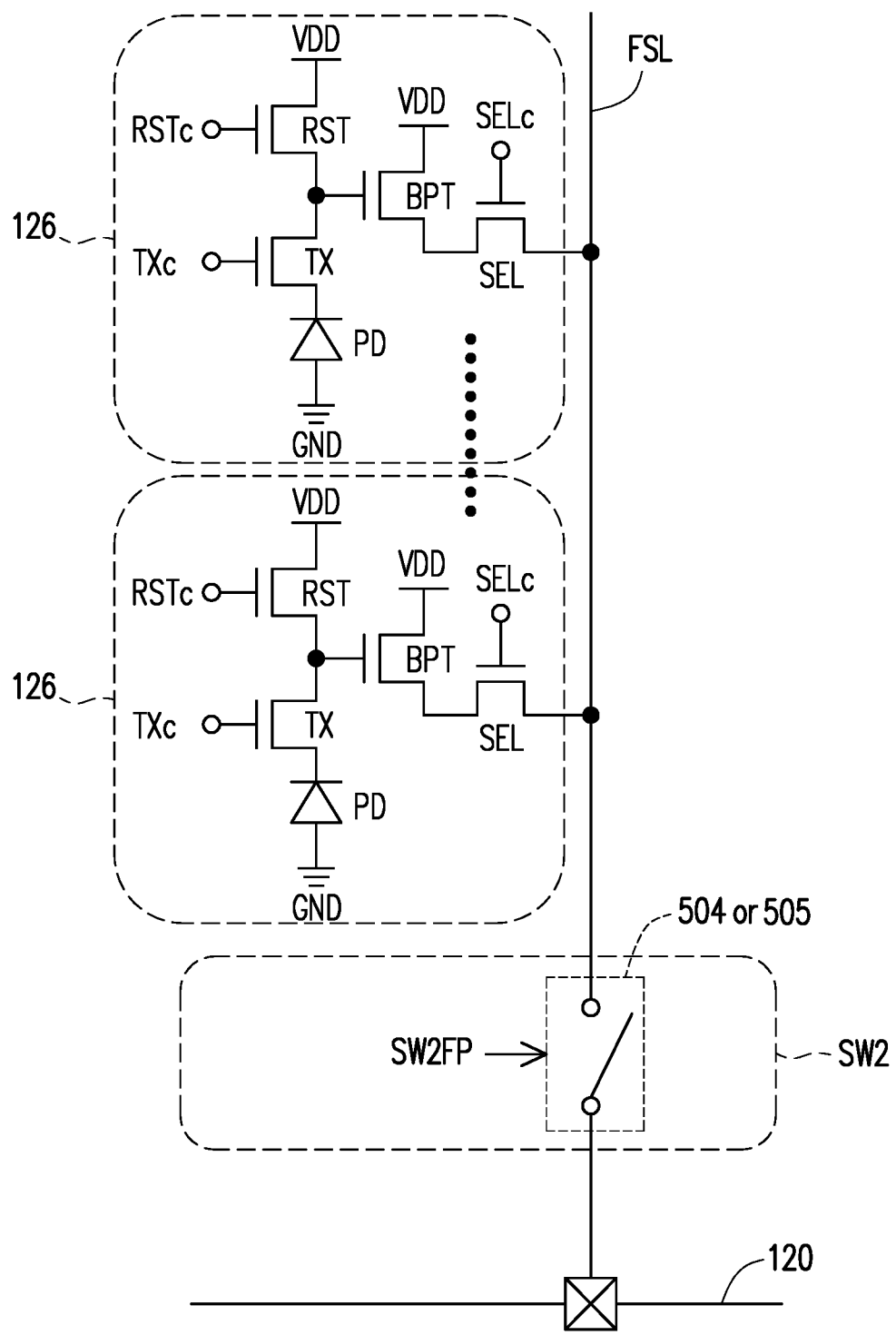
FIG. 12 is a schematic diagram illustrating a detail structure of the fingerprint sensor according to an embodiment of the invention.

FIG. 12 is a schematic diagram illustrating a detail structure of the fingerprint sensor according to an embodiment of the invention. Referring to FIG. 12, the fingerprint sensor 126 operates between system voltages VDD and GND. The fingerprint sensor 126 includes a photodiode PD, a reset transistor RST, a transfer transistor TX, a bypass transistor BPT and a row select transistor SEL. The gate terminals of the reset transistor RST, the transfer transistor TX and the row select transistor SEL are respectively controlled by control signals RSTc, TXc and SELc. These control signals are operated for fingerprint scan control and enabled only in the fingerprint sensing phase. In other words, the row select transistors SEL of the fingerprint sensors 126 are turned off in the touch sensing phase, such that the fingerprint sensing lines FSL are not driven by the fingerprint sensors 126. Therefore, the fingerprint sensors 126 do not affect conduction state of the fingerprint sensing lines FSL. This facilitates the control of the switch circuits SW1 and SW2 to transmit the synchronization signal S7 to the fingerprint sensing lines FSL in the touch sensing phase. In addition, enough teaching, suggestion, and implementation illustration for the operation of the fingerprint sensor 126 can be obtained with reference to common knowledge in the related art, which is not repeated hereinafter.

In summary, in the embodiments of the invention, the display driving signal and the fingerprint sensing signal are transmitted on the same transmission line in different phases. The transmission line is shared by the display driving signal and the fingerprint sensing signal. The electronic circuit outputs the display driving signal to the display panel and receives the fingerprint sensing signal from the display panel via the same pin connected to the transmission line. The routing between the electronic circuit and the display panel is simple. The width of the fan-out area corresponding to the electronic circuit and the frame border size of the display panel near the electronic circuit are small. In addition, the touch area is determined to define the fingerprint sensing zone for covering a fingerprint image. The control circuit selects a part of the fingerprint sensing lines for fingerprint sensing operation according to the touch area. A part of switches corresponding to the part of fingerprint sensing lines is turned on to couple the part of fingerprint sensing lines to the fingerprint sensing channels. A part of the fingerprint sensing lines collocated with the touch area on the display panel is selected among a plurality of the fingerprint sensing lines arranged all over the display panel. The selected fingerprint sensing lines can flexibly form a fingerprint sensing zone having a size/range determined by the touch area, such that only a single-turn receiving of fingerprint sensing signals in fingerprint sensing channels is required. The time for fingerprint sensing is reduced. Therefore, the method for the fingerprint sensing and identification is more efficient, and users have good user experience.

In addition, some switch units are added to the switch circuit of the display panel for signal transmission transmitting the fingerprint sensing signals from the fingerprint sensing lines to the electronic circuit via the transmission lines. Therefore, the resolution of the fingerprint image can be maintained under the condition that the transmission lines are shared by the display driving signals and the fingerprint sensing signals.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic circuit, adapted to drive a display panel comprising touch sensors and fingerprint sensors, the electronic circuit comprising:
   a first circuit, configured to generate display driving signals for driving data lines of the display panel;
   a second circuit, configured to receive fingerprint sensing signals corresponding to a fingerprint image from the fingerprint sensors;
   a first switch circuit, located outside the display panel and electrically coupled to a second switch circuit that is located inside the display panel via a transmission line, comprising a plurality of first switch elements coupled to the first circuit and a plurality of second switch elements coupled to the second circuit, wherein the plurality of first switch elements and the plurality of second switch elements are not arranged on the display panel, and the plurality of first switch elements and the plurality of second switch elements are directly coupled to the transmission line; and
   a control circuit, configured to generate control signals for controlling the first switch circuit, so as to
   control the electronic circuit to transmit the display driving signals from the first circuit to the data lines through a first part of the first switch elements in a first time interval, and
   control the electronic circuit to receive the fingerprint sensing signals from the fingerprint sensors of the display panel through the second switch elements in a second time interval.

2. The electronic circuit of claim 1, wherein the control circuit turns on the first part of the first switch elements and turns off a second part of the first switch elements in the first time interval.

3. The electronic circuit of claim 2, wherein the control circuit turns off all of the second switch elements in the first time interval.

4. The electronic circuit of claim 1, wherein the control circuit turns off all of the first switch elements in the second time interval.

5. The electronic circuit of claim 1, wherein the first time interval corresponds to a display driving phase, and the second time interval corresponds to a fingerprint sensing phase.

6. The electronic circuit of claim 1, wherein the first switch circuit comprises a plurality of first terminals coupled to the first circuit and the second circuit and a plurality of second terminals configurable to be coupled to the second switch circuit on the display panel.

7. The electronic circuit of claim 6, wherein the first switch circuit comprises a plurality of switch units, and each of the switch units of the first switch circuit comprises:
   one of the first switch elements, coupled between the first circuit and a corresponding one of the second terminals; and
   one of the second switch elements, coupled between the second circuit and the corresponding one of the second terminals.

8. The electronic circuit of claim 7, wherein the second switch element comprises:
   a first switch device, coupled to the corresponding one of the second terminals and the second circuit and is controlled to transmit the fingerprint sensing signals to the second circuit in the second time interval; and
   a second switch device, coupled between the first switch device and the second circuit and is controlled to transmit the fingerprint sensing signals to the second circuit in response to a determination of a touch information, wherein the first switch device and the second switch device are controlled by different control signals.

9. The electronic circuit of claim 6, wherein the second switch circuit comprises a plurality of third terminals coupled to the data lines and fingerprint sensing lines of the display panel and a plurality of fourth terminals configurable to be coupled to the second terminals of the first switch circuit.

10. The electronic circuit of claim 9, wherein the second switch circuit comprises a plurality of first switch units, and each of the first switch units of the second switch circuit comprises:

a plurality of third switch elements, coupled between respective first part of the third terminals and one of the fourth terminals, and the third switch elements are switched to receive the display driving signals from the electronic circuit in the first time interval; and one or more fourth switch elements, coupled between respective second part of the third terminals and the one of the fourth terminals, and the fourth switch elements are switched to transmit the fingerprint sensing signals to the electronic circuit in the second time interval.

11. The electronic circuit of claim 10, wherein
the first part of the third terminals is coupled to the data lines of the display panel, and the second part of the third terminals is coupled to the fingerprint sensing lines.

12. The electronic circuit of claim 10, wherein the data lines coupled to the same first switch unit are connected to sub-pixels of four different colors, and the sub-pixels of the four different colors arranged in a row.

13. The electronic circuit of claim 10, wherein the second switch circuit further comprises a plurality of fifth terminals coupled to the fingerprint sensing lines of the display panel and a plurality of sixth terminals configurable to be coupled to the second terminals of the first switch circuit.

14. The electronic circuit of claim 13, wherein the second switch circuit further comprises a plurality of second switch units, and each of the second switch units of the second switch circuit comprises:

a fifth switch element, coupled between the respective fifth terminal and the respective sixth terminal, wherein the fifth switch elements are switched to transmit the fingerprint sensing signals to the second switch elements of the electronic circuit in the second time interval.

15. The electronic circuit of claim 14, wherein at least two of the second switch units are adjacent.

16. The electronic circuit of claim 14, wherein the second switch units are not adjacent to each other.

17. The electronic circuit of claim 1, wherein the electronic circuit is implemented in a semiconductor chip.

18. A display panel, comprising:
a plurality of pixels and touch sensors;
a plurality of data lines, coupled to the pixels and configured to receive display driving signals;
a plurality of fingerprint sensors, configured to sense a fingerprint image and generate fingerprint sensing signals corresponding to the fingerprint image;
a plurality of fingerprint sensing lines, coupled to the fingerprint sensors and configured to transmit the fingerprint sensing signals; and
a switch circuit, comprising a plurality of first switch units coupled to the data lines and a first part of the fingerprint sensing lines and a plurality of second switch units coupled to a second part of the fingerprint sensing lines, wherein the first switch units are switched to receive the display driving signals from an electronic circuit in a first time interval, and the first switch units and the second switch units are switched to transmit the fingerprint sensing signals to the electronic circuit in a second time interval, wherein each of the first switch units comprises:
a plurality of first switch elements, switched to receive the display driving signals from the electronic circuit in the first time interval; and
one or more second switch elements, switched to transmit the fingerprint sensing signals to the electronic circuit in the second time interval, wherein the switch circuit comprises a plurality of first terminals coupled to the data lines and the fingerprint sensing lines and a plurality of second terminals configurable to be coupled to the electronic circuit, wherein each of the first switch units comprises:
the plurality of first switch elements, coupled between respective first part of the first terminals and one of the second terminals; and
the one or more second switch elements, coupled between respective second part of the first terminals and the one of the second terminals.

19. The display panel of claim 18, wherein
the first part of the first terminals is coupled to the data lines of the display panel, and the second part of the first terminals is coupled to the fingerprint sensing lines.

20. The display panel of claim 19, wherein the data lines coupled to the same first switch unit are connected to sub-pixels of four different colors, and the sub-pixels of the four different colors arranged in a row.

21. The display panel of claim 18, wherein the switch circuit further comprises a plurality of third terminals coupled to the fingerprint sensing lines of the display panel and a plurality of fourth terminals configurable to be coupled to the electronic circuit.

22. The display panel of claim 21, wherein each of the second switch units comprises:
a third switch element, coupled between the respective third terminal and the respective fourth terminal, wherein the third switch elements are switched to transmit the fingerprint sensing signals to the electronic circuit in the second time interval.

23. The display panel of claim 22, wherein at least two of the second switch units are adjacent.

24. The display panel of claim 22, wherein the second switch units are not adjacent to each other.

25. The display panel of claim 18, wherein the first time interval corresponds to a display driving phase, and the second time interval corresponds to a fingerprint sensing phase.

26. An electronic device, comprising:
a display panel comprising touch sensors and fingerprint sensors; and
an electronic circuit, configurable to be coupled to the display panel and adapted to drive the display panel with display driving signals and receive fingerprint sensing signals corresponding to a fingerprint image from the fingerprint sensors,
wherein the electronic circuit comprises a first switch circuit, the first switch circuit is located outside the display panel and is electrically coupled to a second switch circuit that is located inside the display panel via a transmission line, the first switch circuit comprises a plurality of first switch elements and a plurality of second switch elements, and the electronic circuit generates control signals for controlling the first switch circuit, so as to transmit the display driving signals to the display panel through a first part of the first switch elements in a first time interval, and receive the fingerprint sensing signals from the fingerprint sensors through the second switch elements in a second time interval, wherein the plurality of first switch elements and the plurality of second switch elements are directly coupled to the transmission line, wherein the plurality of first switch elements and the plurality of second switch elements are not arranged on the display panel.

27. The electronic device of claim 26, wherein the first time interval corresponds to a display driving phase, and the second time interval corresponds to a fingerprint sensing phase.

28. The electronic device of claim 26, wherein the electronic circuit comprising:
a first circuit, configured to generate the display driving signals for driving data lines of the display panel through the first switch circuit;
a second circuit, configured to receive the fingerprint sensing signals corresponding to the fingerprint image from the fingerprint sensors through the first switch circuit; and
a control circuit, configured to generate the control signals for controlling the first switch circuit, so as to
control the electronic circuit to transmit the display driving signals from the first circuit to the data lines through the first part of the first switch elements in the first time interval, and
control the electronic circuit to receive the fingerprint sensing signals from the fingerprint sensors of the display panel through the second switch elements and the first switch circuit in the second time interval.

29. The electronic device of claim 28, wherein the control circuit turns on the first part of the first switch elements and turns off a second part of the first switch elements in the first time interval.

30. The electronic device of claim 29, wherein the control circuit turns off all of the second switch elements in the first time interval.

31. The electronic device of claim 28, wherein the control circuit turns on all of the second switch elements and turns off all of the first switch elements in the second time interval.

32. The electronic device of claim 28, wherein the first switch circuit comprises a plurality of first terminals coupled to the first circuit and the second circuit and a plurality of second terminals configurable to be coupled to a second switch circuit on the display panel.

33. The electronic device of claim 32, wherein the first switch circuit comprises a plurality of switch units, each of the switch units of the first switch circuit comprises:
one of the first switch elements, coupled between the first circuit and a corresponding one of the second terminals and is controlled to transmit the display driving signals from the first circuit in the first time interval; and
one of the second switch elements, coupled between the second circuit and the corresponding one of the second terminals and is controlled to transmit the fingerprint sensing signals to the second circuit in the second time interval.

34. The electronic device of claim 33, wherein the second switch element comprises:
a first switch device, coupled to the corresponding one of the second terminals and the second circuit and is controlled to transmit the fingerprint sensing signals to the second circuit in the second time interval; and
a second switch device, coupled between the first switch device and the second circuit and is controlled to transmit the fingerprint sensing signals to the second circuit in response to a determination of a touch information,
wherein the first switch device and the second switch device are controlled by different control signals.

35. The electronic device of claim 26, wherein the electronic circuit is implemented in a semiconductor chip.

36. The electronic device of claim 26, wherein the display panel further comprises:
a plurality of pixels;
a plurality of data lines, coupled to the pixels and configured to receive the display driving signals;
a plurality of fingerprint sensing lines, coupled to the fingerprint sensors and configured to transmit the fingerprint sensing signals; and
the second switch circuit, comprising a plurality of third terminals coupled to the data lines and the fingerprint sensing lines and a plurality of fourth terminals configurable to be coupled to the electronic circuit.

37. The electronic device of claim 36, wherein the second switch circuit comprises a plurality of first switch units, each of the first switch units of the second switch circuit comprises:
a plurality of third switch elements, coupled between respective first part of the third terminals and one of the fourth terminals, and the third switch elements are switched to receive the display driving signals from the electronic circuit in the first time interval; and
one or more fourth switch elements, coupled between respective second part of the third terminals and the one of the fourth terminals, and the fourth switch elements are switched to transmit the fingerprint sensing signals to the electronic circuit in the second time interval.

38. The electronic device of claim 37, wherein
the first part of the third terminals is coupled to the data lines of the display panel, and the second part of the third terminals is coupled to the fingerprint sensing lines.

39. The electronic device of claim 37, wherein the data lines coupled to the same first switch unit are connected to sub-pixels of four different colors, and the sub-pixels of the four different colors arranged in a row.

40. The electronic device of claim 37, wherein the second switch circuit further comprises a plurality of fifth terminals coupled to the fingerprint sensing lines of the display panel and a plurality of sixth terminals configurable to be coupled to the second terminals of the first switch circuit.

41. The electronic device of claim 40, wherein the second switch circuit further comprises a plurality of second switch units, and each of the second switch units of the second switch circuit comprises:
a fifth switch element, coupled between the respective fifth terminal and the respective sixth terminal, wherein the fifth switch elements are switched to transmit the fingerprint sensing signals to the second switch elements of the electronic circuit in the second time interval.

42. The electronic circuit of claim 41, wherein at least two of the second switch units are adjacent.

43. The electronic circuit of claim 41, wherein the second switch units are not adjacent to each other.

* * * * *